(12) United States Patent
Korcz et al.

(10) Patent No.: US 10,256,613 B2
(45) Date of Patent: Apr. 9, 2019

(54) MOUNTING BRACKET WITH FAR SIDE SUPPORT

(71) Applicant: HUBBELL INCORPORATED, Shelton, CT (US)

(72) Inventors: Krzysztof Korcz, Grainger, IN (US); Steven J. Johnson, Buchanan, MI (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 15/794,664

(22) Filed: Oct. 26, 2017

(65) Prior Publication Data

US 2018/0048134 A1    Feb. 15, 2018

Related U.S. Application Data

(63) Continuation of application No. 15/042,394, filed on Feb. 12, 2016, now Pat. No. 9,825,446.

(60) Provisional application No. 62/115,916, filed on Feb. 13, 2015.

(51) Int. Cl.
*E04G 25/00* (2006.01)
*H02G 3/12* (2006.01)

(52) U.S. Cl.
CPC .................. *H02G 3/125* (2013.01)

(58) Field of Classification Search
CPC ........................................................ H02G 3/125

USPC ...... 248/200.1, 300, 544, 906, 909; 220/3.9; 174/58, 480

See application file for complete search history.

(56) References Cited

U.S. PATENT DOCUMENTS

| | | | |
|---|---|---|---|
| 5,386,959 A | 2/1995 | Laughlin et al. |
| 7,053,300 B2 | 5/2006 | Denier |
| 7,798,458 B2 | 9/2010 | Borbolla |
| 7,956,285 B2 | 6/2011 | Tally |
| 8,042,776 B2 | 10/2011 | Johnson |
| 8,378,213 B1 | 2/2013 | Gerardo |
| 8,403,289 B1 | 3/2013 | Rinderer |
| 2005/0067180 A1 | 3/2005 | Dinh |
| 2005/0067546 A1 | 3/2005 | Dinh |
| 2006/0005987 A1 | 1/2006 | Denier et al. |
| 2010/0000783 A1 | 1/2010 | Tally et al. |
| 2010/0108347 A1 | 5/2010 | Korez |
| 2016/0099555 A1 | 4/2016 | Nikayin |

*Primary Examiner* — Gwendolyn W Baxter
(74) *Attorney, Agent, or Firm* — Dickinson Wright PLLC

(57) ABSTRACT

An electrical box mounting bracket includes a mounting frame having a central opening. A removable support member is coupled to an inner edge of the central opening by a frangible tab. A removable extension member is coupled to the support member by a frangible tab that can be removed and attached to an end of the support member. A cable guide is coupled to an inner edge of the central opening by a first fold line and is bendable to a position for supporting a cable. The cable guide has a body or support plate with a plurality of adjacent cable openings with a retaining tab between two adjacent cable openings. The retaining tab is bendable from a first open position for inserting a cable into the cable openings and a second closed position to retain the cable in the cable openings.

20 Claims, 12 Drawing Sheets

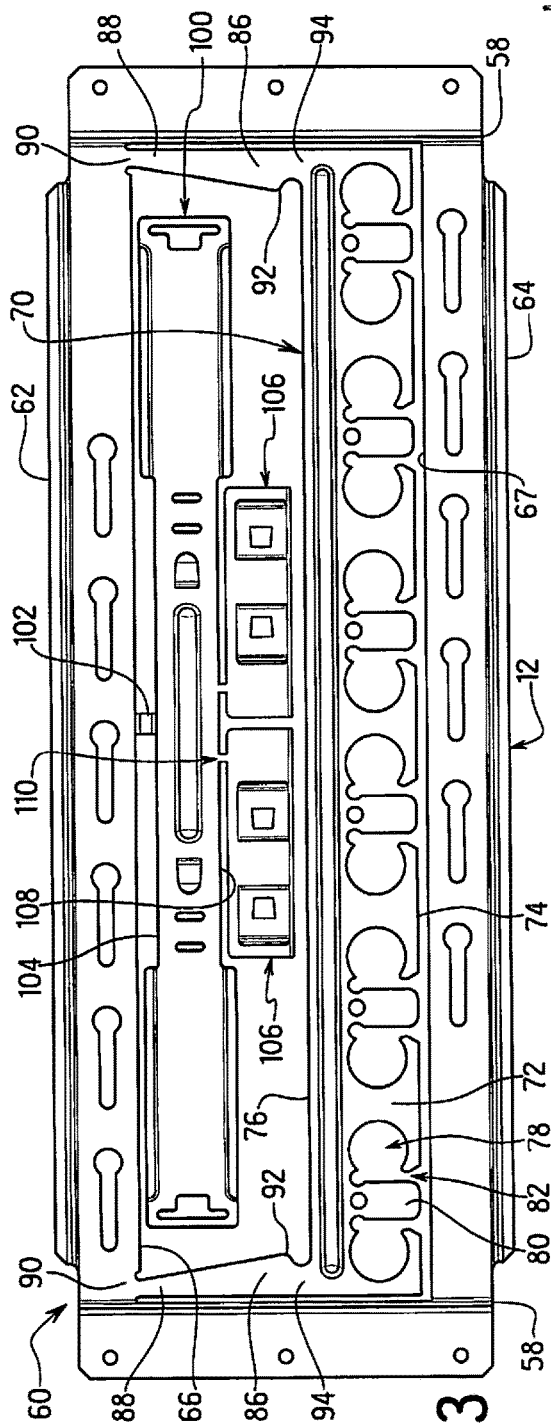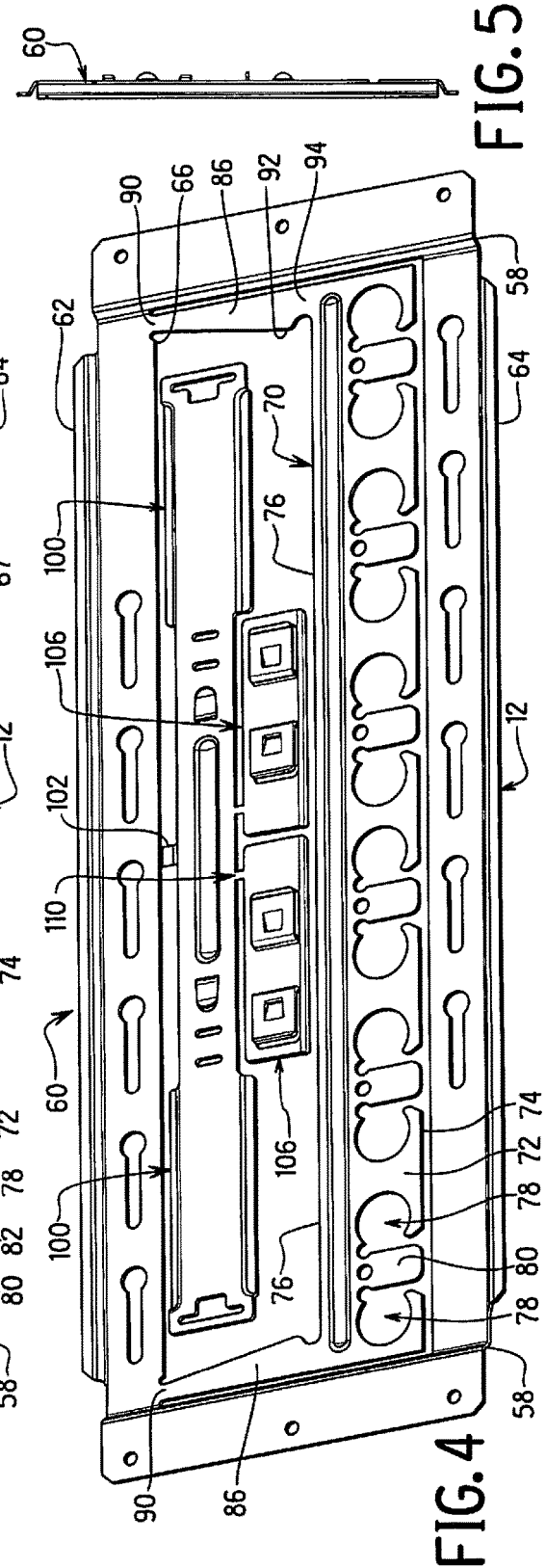

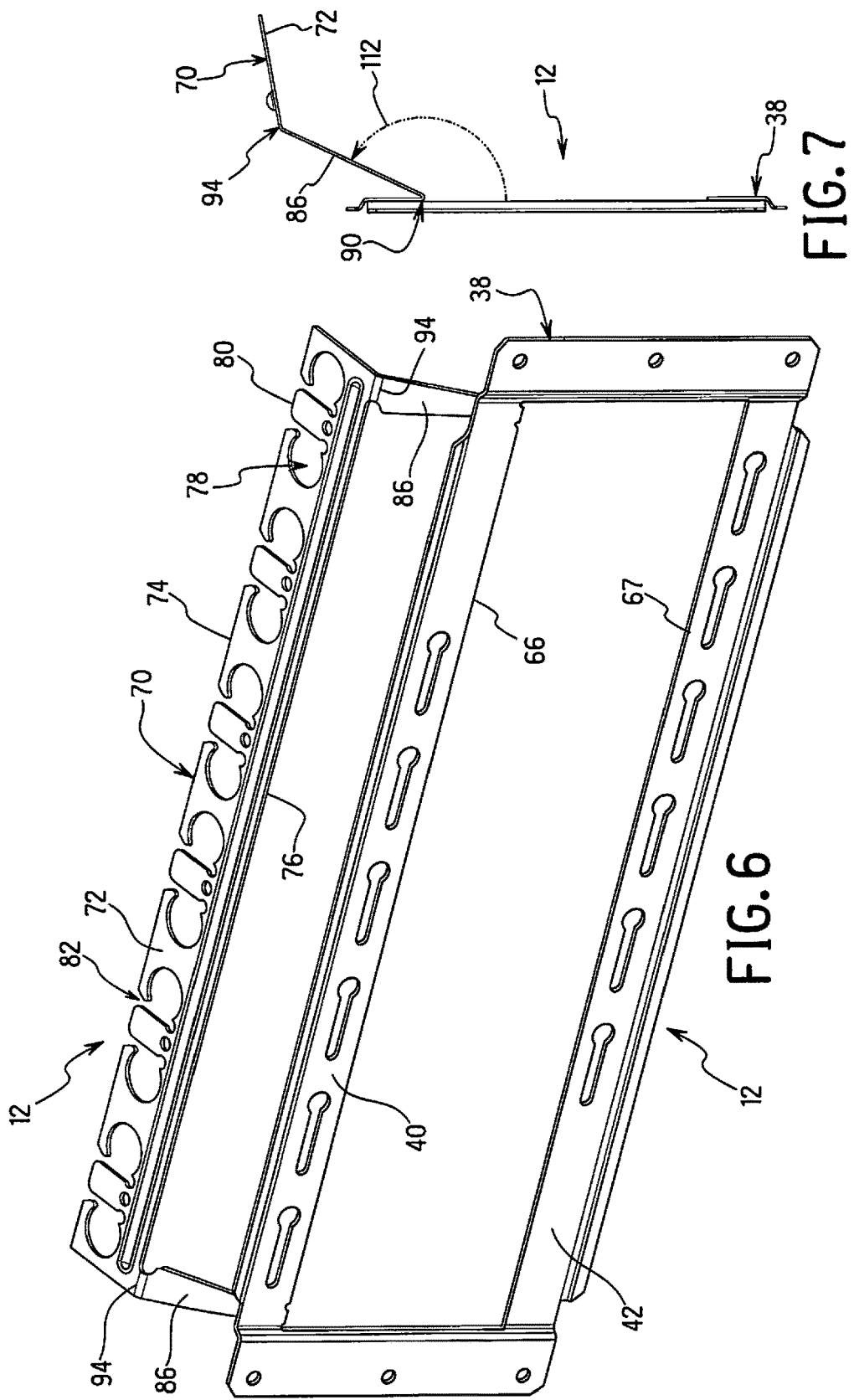

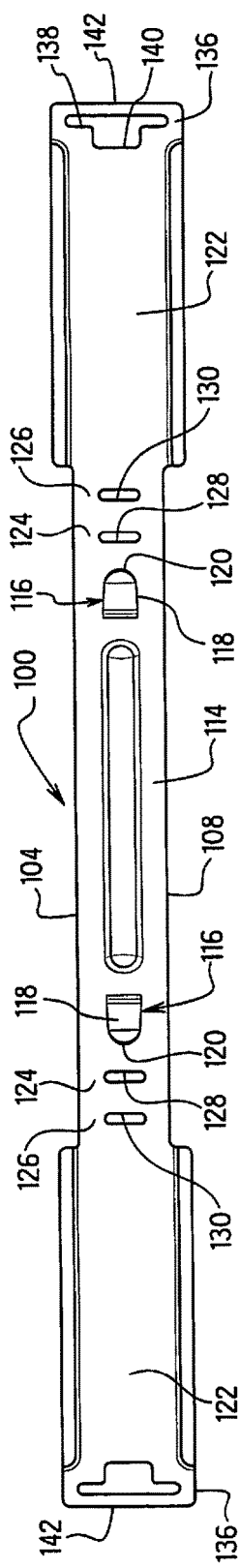
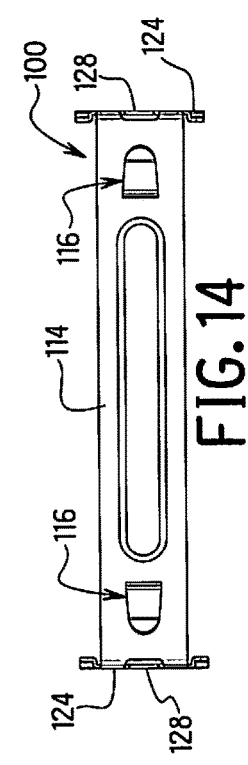
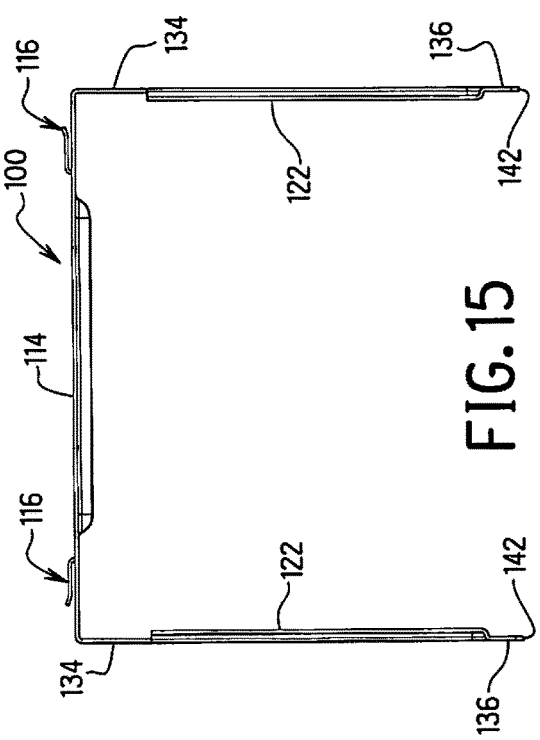
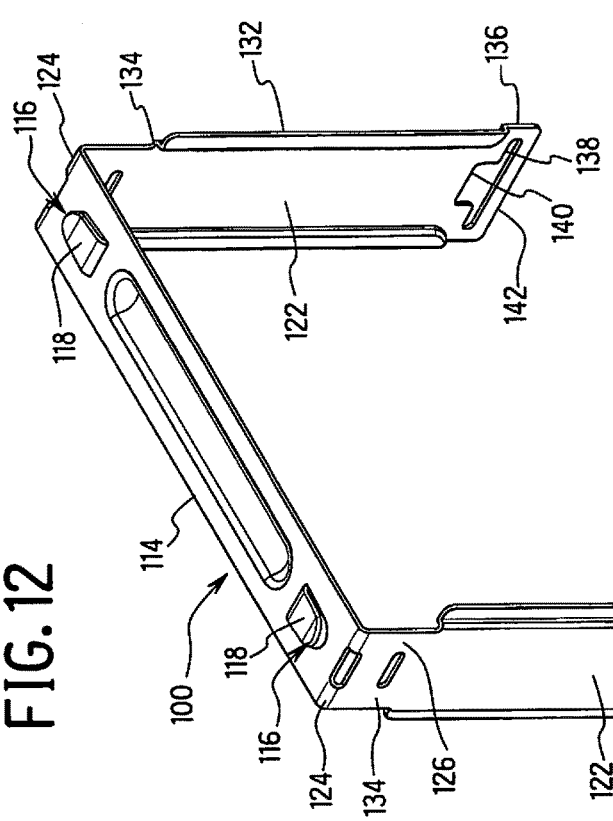

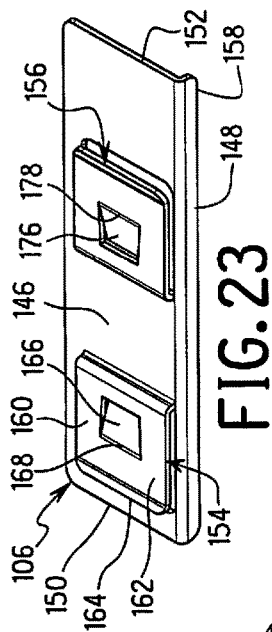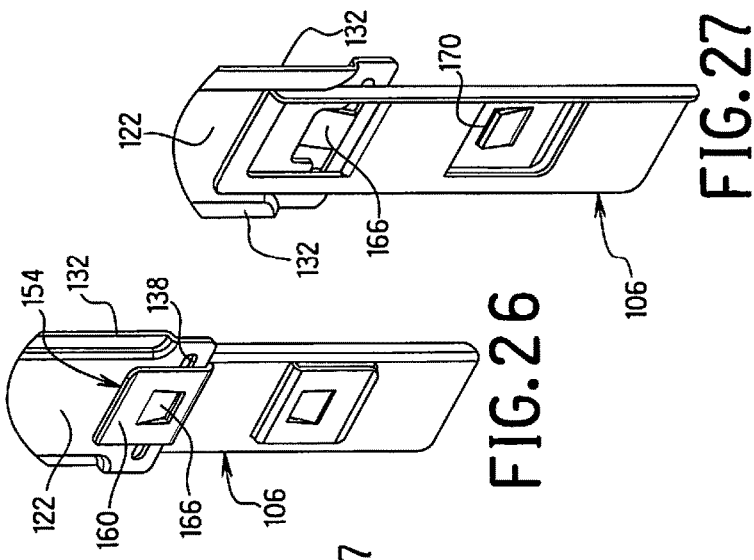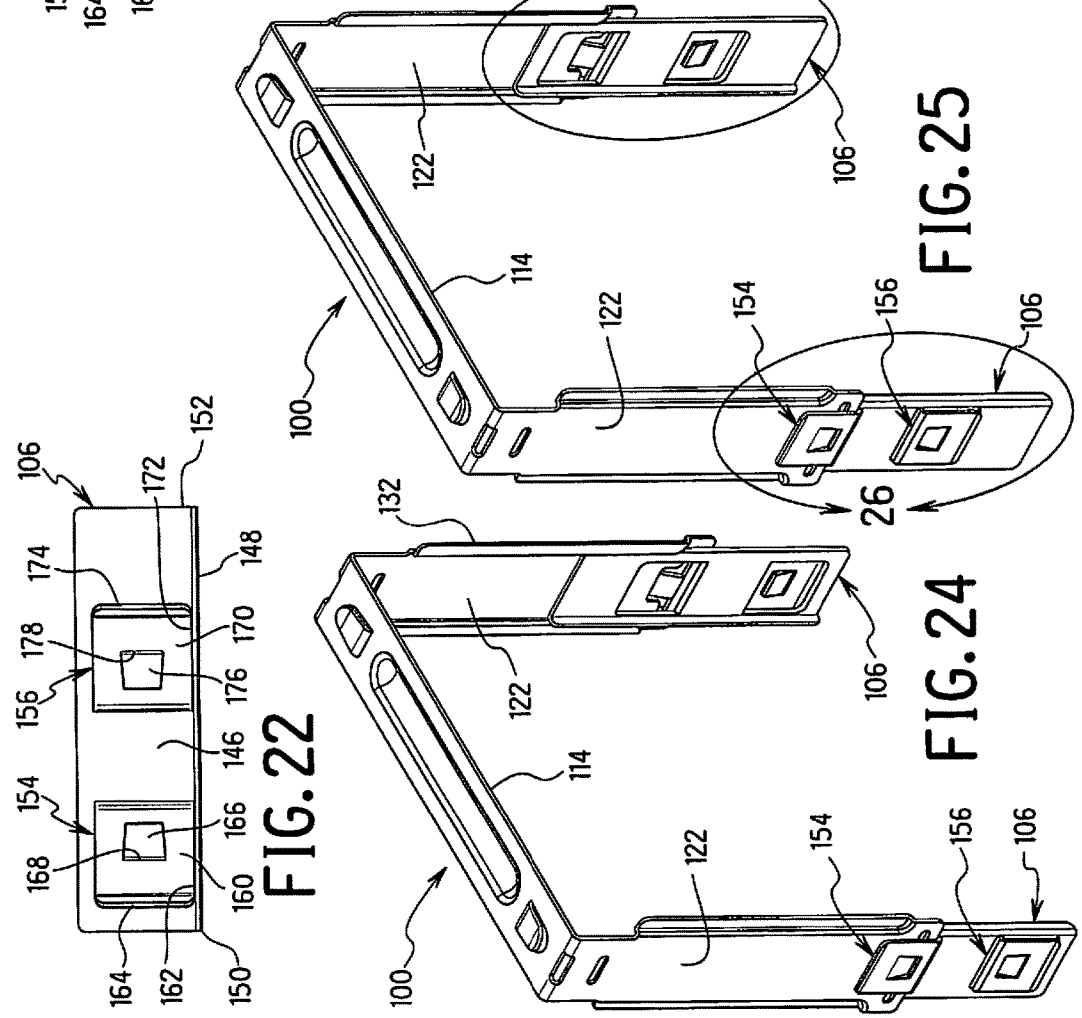

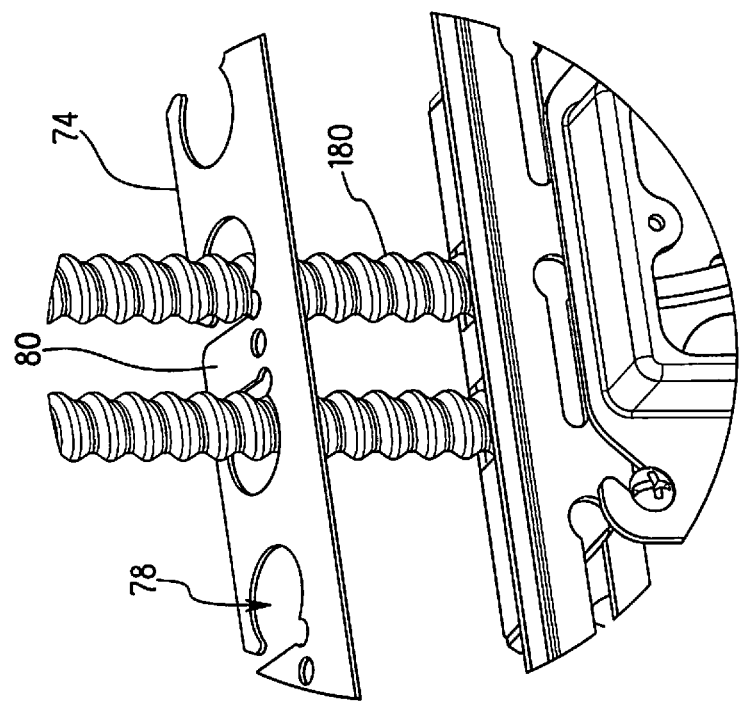
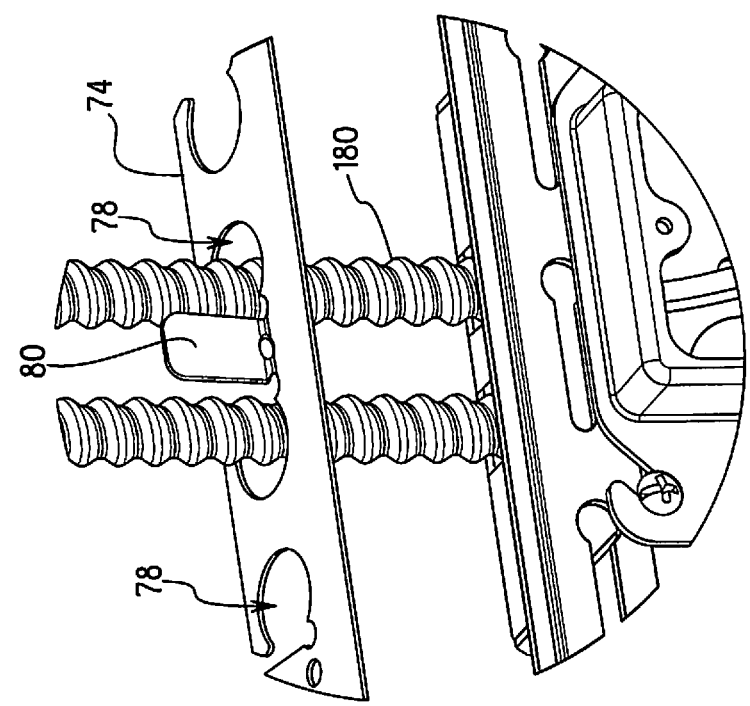

MOUNTING BRACKET WITH FAR SIDE SUPPORT

This application is a continuation application of U.S. Ser. No. 15/042,394 filed Feb. 12, 2016, which claims priority under 35 USC § 119(e) to U.S. Provisional Application No. 62/115,916, filed Feb. 13, 2015, which are hereby incorporated by reference in their entirety.

FIELD OF THE INVENTION

The present invention is directed to a mounting bracket for supporting an electrical box between two studs in a wall. More specifically, the invention is directed to a mounting bracket that is capable of mounting electrical boxes in different positions between the studs and supporting the electrical box in a wall cavity having different depths by providing a far support side that can be attached to the mounting bracket.

BACKGROUND OF THE INVENTION

Presently, there are many types of mounting brackets available on the market for mounting electrical boxes to wall studs. Many of the mounting brackets are designed to be mounted to a single wall stud for supporting a single electrical box. While these mounting brackets work well, they do not provide a wide range of adjustability between wall studs and only support a single electrical box. Accordingly, mounting brackets for supporting a plurality of electrical boxes have been developed which span between a pair of adjacent wall studs to allow the builder to conveniently position the electrical box or boxes between the wall studs.

One example of a prior mounting bracket, which is capable of supporting a wide variety of electrical boxes, is disclosed in U.S. Pat. No. 5,330,137 to Oliva. The mounting bracket of the Oliva patent provides infinite adjustability and can be used with boxes of different depths. Moreover, the mounting bracket of the Oliva patent can be used to either a 4 inch square electrical box or a 4$^{11}/_{16}$ inch square electrical box or both. However, one disadvantage of the mounting bracket disclosed in this patent is that it allows for too much vertical movement of certain sizes of electrical boxes such that one of the mounting screws of a wiring device can bottom out on the mounting bracket and thus cannot be fully threaded into the cover. More specifically, the central cutout of the mounting bracket of this patent is too large such that mounting screws coupling the electrical box and cover together can move vertically within the central cutout of the mounting bracket of the patent. This movement of the electrical box can cause the threaded hole in the cover for mounting a wiring device to overlap with the mounting bracket such that the mounting screw of the wiring device cannot be fully threaded into the cover.

Examples of mounting brackets for electrical boxes are disclosed in U.S. Pat. No. 5,927,667 to Swanson and U.S. Pat. No. 6,209,836 to Swanson. These devices have a bracket that can be mounted to wall studs and support an electrical box between the studs.

While the prior devices are generally suitable for the intended purpose, there is a continuing need in the industry for an improved mounting assembly for mounting electrical boxes and other electrical devices,

SUMMARY OF THE INVENTION

The present invention in one embodiment is directed to a mounting bracket for attaching to a support, such as wall studs, and supporting an electrical box to the support or between the studs. The mounting bracket is manufactured as a one-piece, integrally formed unit that can be bent to the desired position by the end user.

One feature of the invention is to provide a mounting bracket that can accommodate electrical boxes of different sizes and depths. The mounting bracket is attached to the support to position the electrical box at different locations between the studs.

Another aspect of the invention is to provide an electrical box mounting bracket having a far side support member that is able to support the mounting bracket by contacting an opposing wall and resist movement of the mounting bracket and the electrical box toward the opposing wall.

The invention is also directed to an electrical box mounting bracket having far side support member integrally formed with a mounting frame and support member coupled to the mounting frame by a frangible member where the support member can be separated from the mounting frame by the end user during installation. The support member has a plurality of fold lines to define a body to be attached to the mounting frame. A first leg and a second leg are coupled to the ends of the body. The first and second legs are folded by the end user to extend from the plane of the body. The body can be attached to the top and bottom rails of the mounting frame by tabs or other fastening members.

The invention further is directed to a mounting bracket having a cable guide integrally formed with the mounting frame and configured for orienting at an angle with respect to the plane of the frame of the mounting bracket. The cable guide provides a support for cables extending from the electrical box supported by the frame.

The cable guide is coupled to the mounting frame and is bendable about fold lines outward with respect to the plane of the mounting frame to a position for receiving and guiding cables from the electrical box. The cable guide includes a body forming a support plate having a plurality of cable openings for the cables. In one embodiment, the cable guide has a tab positioned between two adjacent cable openings to close the openings at least partially to retain a cable in the cable the cable openings. The tab is bendable between an open position to allow the cable openings to receive a cable and a closed position to retain the cables in the respective openings.

The foregoing objects of the invention are basically attained by providing a mounting bracket for mounting an electrical box comprising a one piece mounting plate having a central opening defined by a top support rail, a bottom support rail, a first mounting end, and a second mounting end. A support member is integrally formed with the mounting plate and coupled to the mounting plate by a frangible member. The support member is removable from the mounting plate and is configured for coupling to the mounting plate and extends away from a plane of the mounting plate for contacting an opposing wall and supporting the mounting bracket.

The various features of the invention are also attained by providing a mounting bracket for supporting an electrical box, the mounting bracket comprising a mounting plate having a top supporting rail, a bottom supporting rail, a first end member and a second end member forming a central opening for accessing an electrical box coupled to the mounting bracket. A cable guide is coupled to an inner edge of the central opening and is oriented in a plane parallel to a plane of the mounting plate in a first position. The cable guide is bendable about a fold line from the first position to a second extended position for receiving a cable coupled to the electrical box.

The features of the invention are also attained by providing a mounting bracket for supporting an electrical box. The mounting bracket comprises a mounting plate having a top rail, a bottom rail, a first end portion and a second end portion and having a central opening with a dimension for accessing an electrical box. A support member is coupled to an inner edge of the central opening by a frangible tab and is removable from the support member. A cable guide is coupled to the inner edge of the central opening by a fold line. The cable guide is in a first position substantially parallel to a plane of the mounting plate and is bendable to a second position spaced outwardly from the mounting plate and is configured for receiving a plurality of cables from the electrical box.

These and other objects, advantages and salient features of the invention will become apparent from the following detailed description of the invention and the annexed drawings which disclose various embodiments of the invention.

BRIEF DESCRIPTION OF THE DRAWINGS

The following is a brief description of the invention, in which:

FIG. 3 is top plan view of the mounting bracket as produced showing the mounting frame, cable guide and support member integrally formed as a planar assembly;

FIG. 4 is a top perspective view of the mounting bracket of FIG. 3;

FIG. 5 is an end view of the mounting bracket of FIG. 3;

FIG. 6 is a front view of the mounting bracket with the support member separated and the cable guide bent to the end position for supporting cables;

FIG. 7 is an end view of the mounting bracket of FIG. 6 showing the cable guide bending outward from the plane of the mounting bracket;

FIG. 12 is a top view of the blank for forming the support bracket;

FIG. 13 is a perspective view of the support member showing the legs bent to the extended position;

FIG. 14 is a top view of the support member of FIG. 13;

FIG. 15 is a side view of the support member of FIG. 13;

FIG. 22 is a front elevation view of the extension member in one embodiment of the invention;

FIG. 23 is a perspective view of the extension member of FIG. 22;

FIG. 24 is a perspective view of the extension member coupled to the support member in one embodiment;

FIG. 25 is a perspective view of the extension member coupled to the leg in another embodiment;

FIG. 26 is an enlarged view of the inner side of leg showing the coupling tab engaging the slot in the leg of FIG. 25;

FIG. 27 is an enlarged view of the inner side of the leg showing the extension member of FIG. 25 coupled to the leg;

FIG. 28 is a perspective view of the cable guide showing the tab in the opening position; and FIG. 29 is a perspective showing the cable guide bent to the closed position.

DETAILED DESCRIPTION OF THE INVENTION

Figure 1:
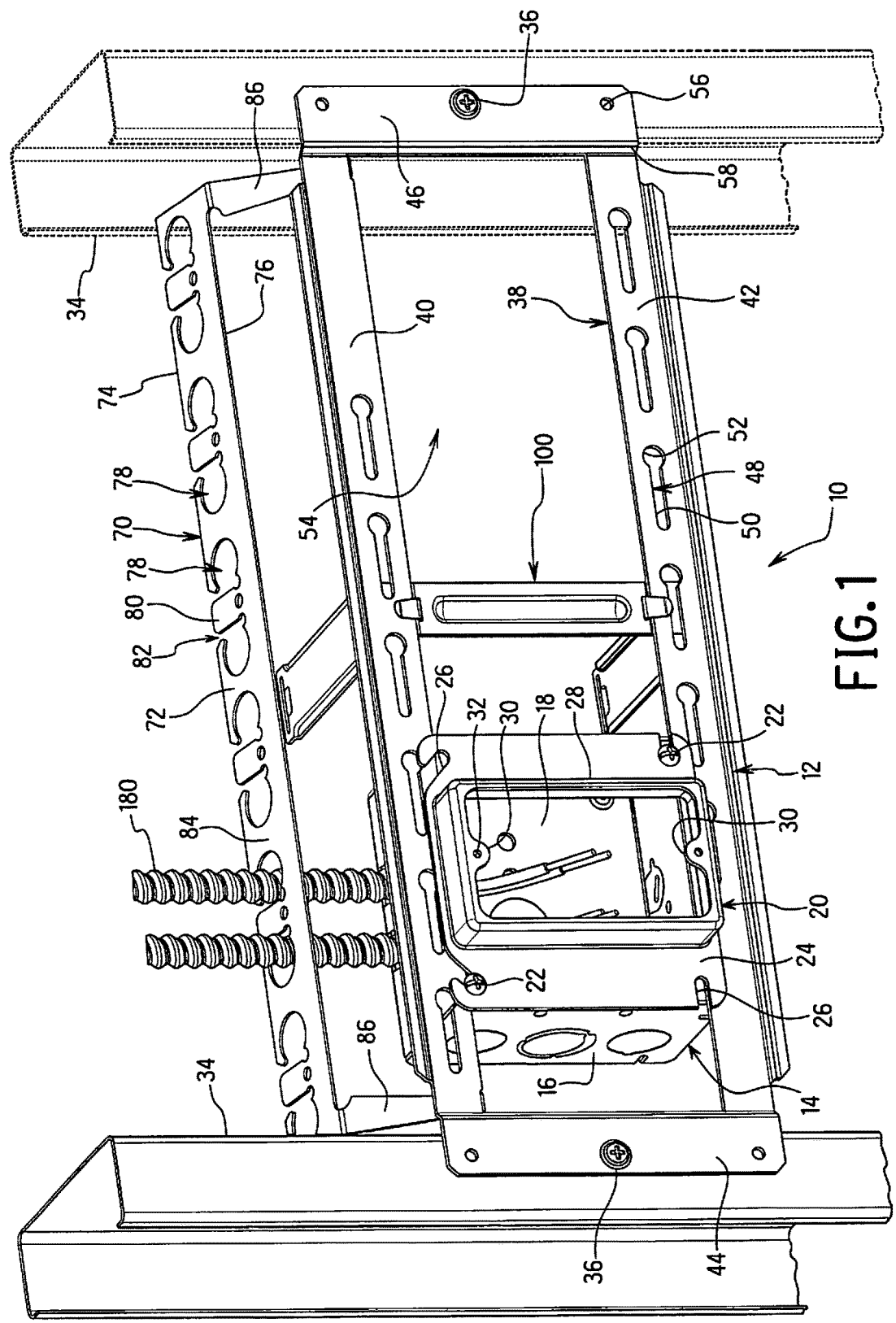
FIG. 1 is a perspective view of the mounting bracket in one embodiment showing an electrical box mounted in different orientations and showing the cables coupled to the electrical box and extending through the cable guide.

The present invention is directed to a mounting bracket for supporting an electrical box between two studs in a wall. More specifically, the invention is directed to a mounting bracket that is capable of mounting one or more electrical boxes in different positions relative to a support and supporting the electrical box in a wall cavity by providing a far side support that can be attached to the mounting bracket and modifying or adjusting the length to complement the depth of the wall cavity.

Referring to the drawings, the invention is directed to an electrical box assembly 10 including a mounting bracket 12 and an electrical box 14. The electrical box 14 is a standard electrical box having side walls 16 extending from a bottom wall 18 for receiving an electrical wiring device. The wiring device can be an electrical outlet, switch, GFCI or other device commonly mounted in an electrical box. In the embodiment shown, an extension ring 20 is coupled to the open end of the electrical box by screws 22. The extension ring, also referred to as a mud ring, has a base 24 with screw openings 26 for receiving the screws 22. The screws 22 are threaded into threaded holes in mounting tabs formed with the electrical box. A collar 28 extends outward from the base 24 and is provided with inwardly extending tabs 30 having screw holes 32 for receiving coupling screws of the electrical wiring device. The electrical device is not shown for clarity but is a standard device as known in the art.

The mounting bracket 12 is configured for mounting to opposing wall studs 34 or other support structure. In the embodiment shown, the mounting bracket 12 extends between the two studs 34 and attached by screws 36.

Figure 2:
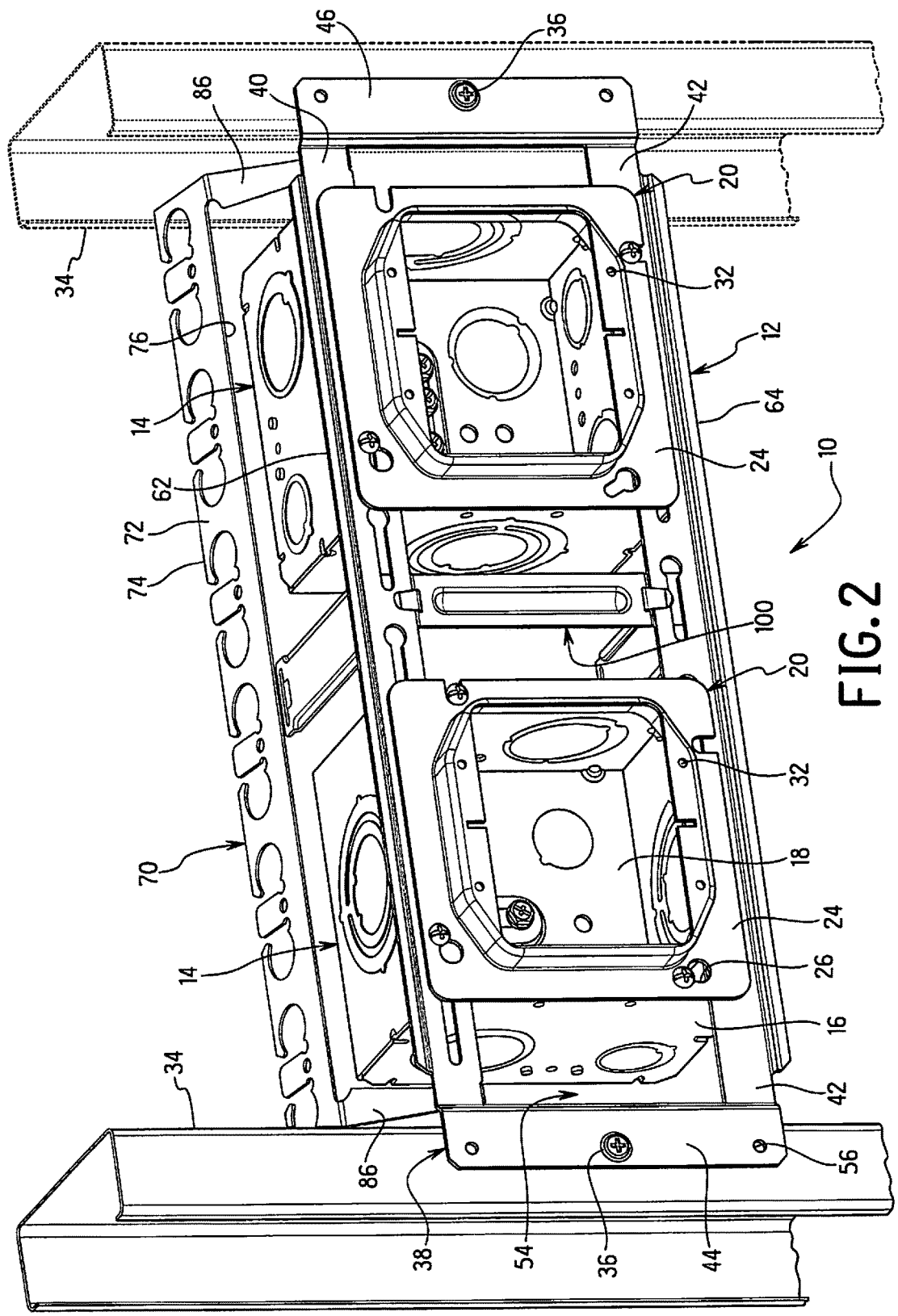
FIG. 2 is a perspective view of the mounting bracket having two electrical boxes mounted to the bracket.
Figure 8:
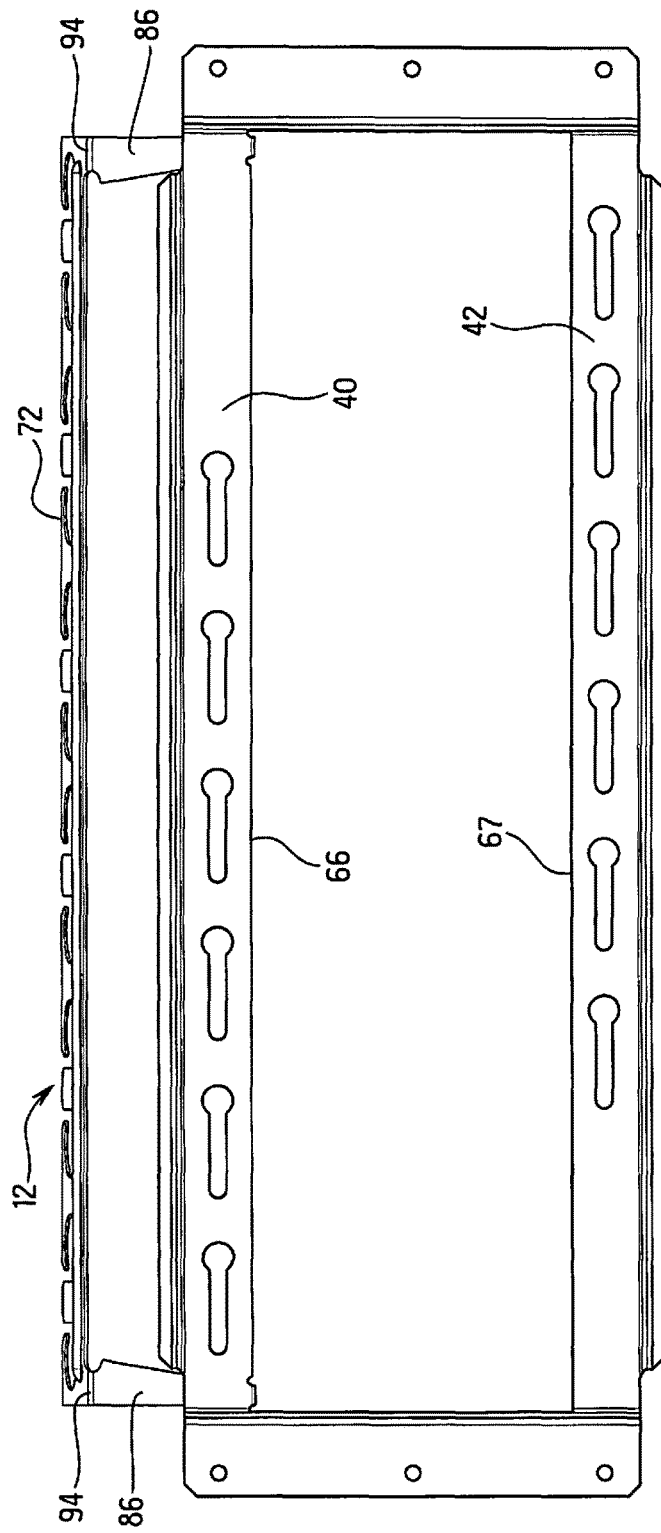
FIG. 8 is a front perspective view of the mounting bracket of FIG. 6.
Figure 9:
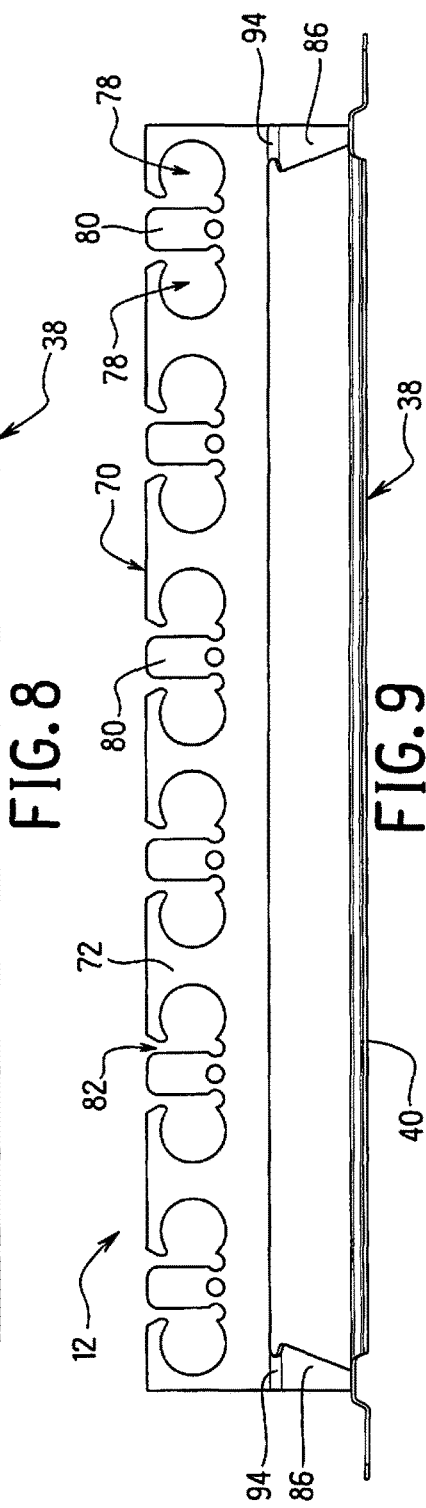
FIG. 9 is a top view of the mounting bracket of FIG. 6.
Figure 10:
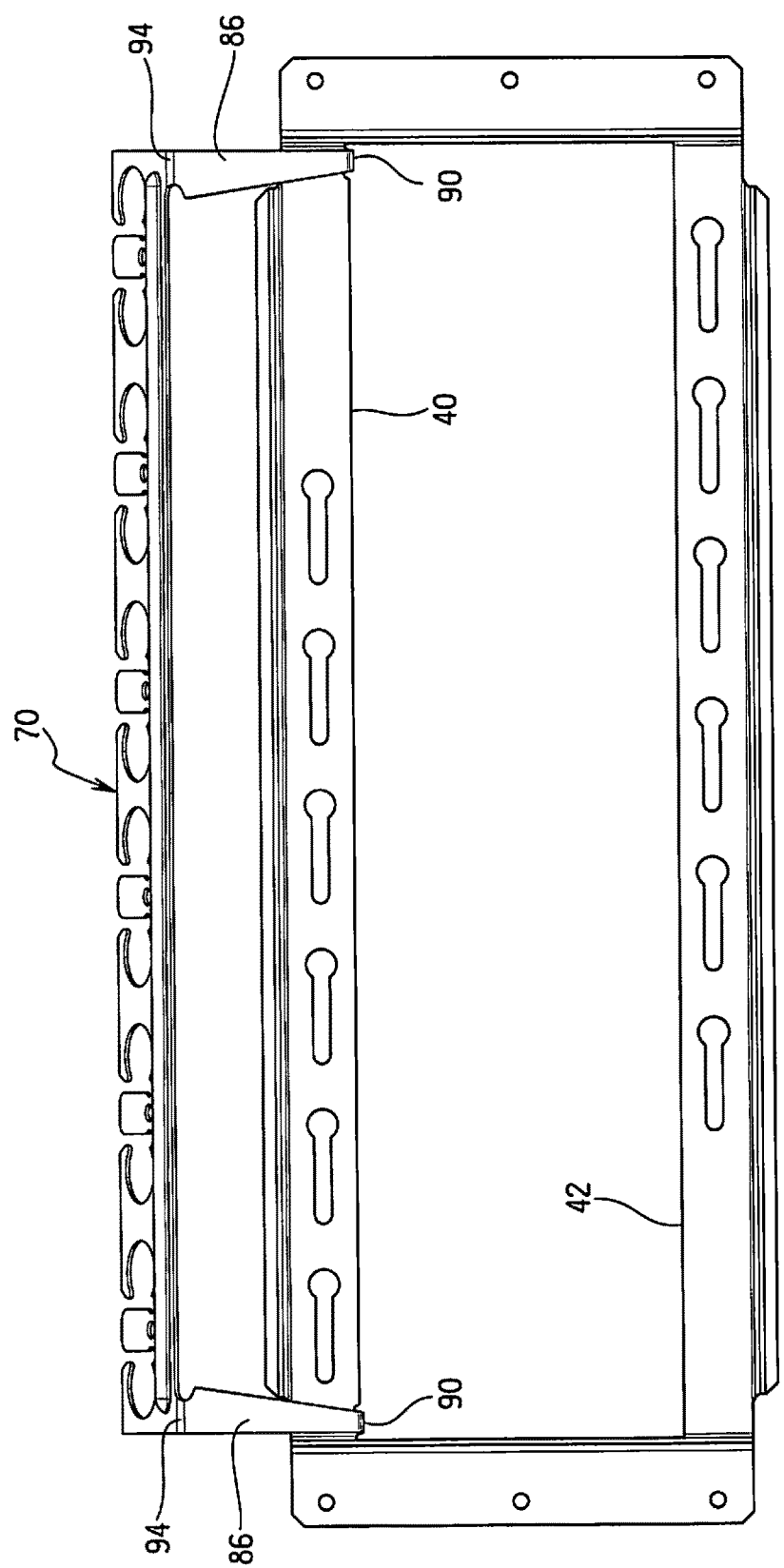
FIG. 10 is a rear view of the mounting bracket of FIG. 6.
Figure 11:
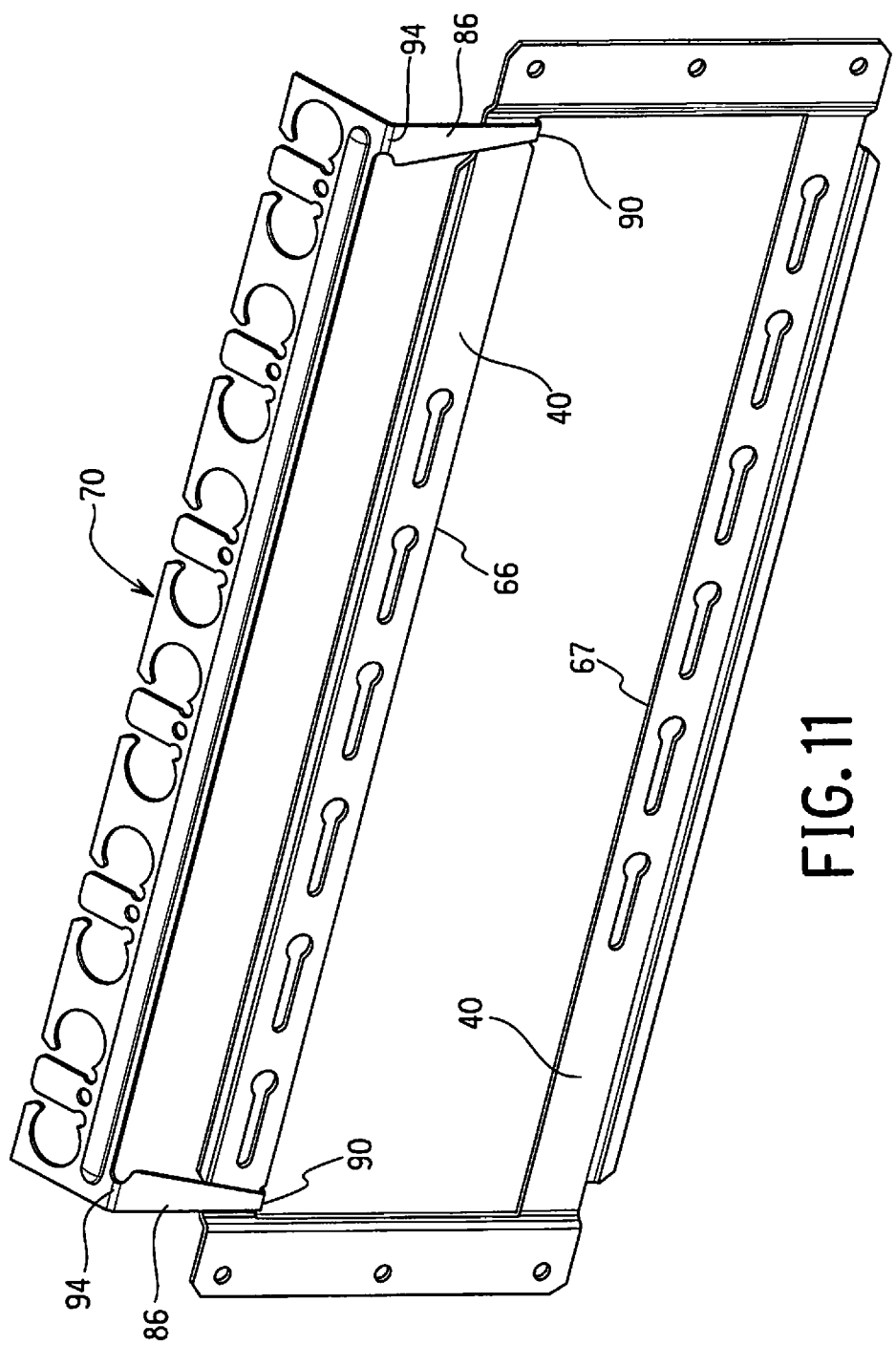
FIG. 11 is rear perspective view of the mounting bracket of FIG. 6.

The mounting bracket 12 is made of steel or other metal that can be bent and formed to the desired shape and dimension. As shown in FIGS. 1 and 2, the mounting bracket 12 in one embodiment has a substantially rectangular configuration having a mounting plate 38 defining a mounting frame with central opening 54. The mounting plate 38 has a first rail referred to as a top rail 40, a second rail referred to as a bottom rail 42, a first mounting end 44, and a second mounting end 46 forming the central opening 54. The top rail 40 and bottom rail 42 include a plurality of spaced apart key-hole shaped slots 48configured for receiving a mounting screw for mounting an electrical box or other electrical device to the mounting plate 38. As show, the key hole shaped slots 48 have a main longitudinal portion 50 extending longitudinally relative the longitudinal dimension of the top rail 40 and bottom rail 42. An enlarged opening 52 is formed at one end of the slot to enable the head of a mounting screw to pass through.

In the embodiment shown, the openings 54 of the mounting plate 38 have a dimension to accommodate one or more of the electrical boxes. As shown in FIGS. 1 and 2, the central opening 54 has a dimension less than the outer dimension of the electrical box and less than the outer dimension of the base 24 of the extension ring 20. In the embodiment shown, the top rail 40 and the bottom rail 42 are captured between the end of the electrical box 14 and the inner face of the extension ring 20. Depending on the location and orientation of the screw holes in the electrical box, the mounting screws 22 can pass through the central opening 54 as shown in FIG. 1 and the left side of FIGS. 2. Alternatively, the electrical box 14 can be oriented so that the screw holes in the electrical box align with the key hole slots 48. The mounting screws 22 can then pass through the screw holes in the base of the extension ring and the key hole shaped slots 48 and threaded into the screw holes in the electrical box as shown in FIG. 2.

The mounting ends 44 and 46 extend outwardly from the top rail 40 and the bottom rail 42 for attaching the support and defining a mounting frame. The mounting ends 44 and 46 are provided with one or more screw holes 56 to receive screws 36 for coupling the mounting bracket 12 to the support. In the embodiment shown, the ends 44 and 46 are coupled to the top rail 40 and bottom rail 42 by legs 58 so that the mounting ends are parallel to the plane of the top rail and bottom rail and spaced outwardly from the plane of the top rail and bottom rail. The mounting ends 44 and 46 are oriented so that the top rail and bottom rail are recessed a slight distance from the outer face of the mounting ends and the outer face of the studs 34.

Referring to FIGS. 3-11, the mounting bracket 12 is formed as a one-piece unitary member from a single sheet of steel that is stamped, cut and bent to the shape shown. In one embodiment, the mounting bracket is formed as a blank 60 as shown in FIGS. 3 and 4 and is then bent by the end user to the desired finished shape of the mounting bracket 12 as shown in FIGS. 1, 2 and 6-11. The blank 60 has a substantially flat, compact configuration before bending by the end user to the desired shape.

Referring to FIGS. 3 and 4, the blank 60 is formed with the mounting plate 38 formed in the shape for mounting to the supports. The top rail 40 and the bottom rail 42 are formed with strengthening ribs 62 and 64, respectively for increasing the strength of the rails and reducing flexing of the mounting plate during use. As shown in FIGS. 3 and 4, the central opening 54 has an inner edge 66 formed with the top rail 40 and an inner edge 67 formed with the bottom rail 42.

A cable guide 70 is integrally formed with the inner edge 66 of the central opening 54 in the mounting plate 38. The cable guide is formed by stamping and cutting the sheet steel and to form the central opening 54 as shown. The cable guide 70 is formed in substantially the same plane with the mounting plate 38 and can be bent by the end user to the extended position shown in FIGS. 1 and 2.

The cable guide 70 has an outer dimension corresponding substantially to the inner dimension of the central opening 54 and is cut from the sheet material to form the central opening 54. The cable guide 70 includes a body forming a support plate 72 having an outer edge 74 and an inner edge 76. As shown in FIGS. 3 and 4, the cable guide 70 and the support plate 72 have a longitudinal length corresponding substantially to the longitudinal length of the central opening 54. The support plate 72 is formed with a plurality of cable openings 78. In the embodiment shown, the cable openings 78 have a substantially circular shape where the adjacent cable openings 78 have an open side facing each other and separated by a tab 80. The cable openings 78 are open to the outer edge 74 and are spaced apart a distance to define an access opening 82 so that the cable 180 can be positioned within each of the cable openings 78 shown in FIG. 28. In the embodiment shown, the support plate 72 has a longitudinally extending reinforcing rib 84 that is stamped from the sheet material to strengthen the support plate. In one embodiment, the reinforcing rib 84 is formed at the inner edge 78 and extends substantially the longitudinal length of the support plate 72.

The support plate 72 of the cable guide 70 includes legs 86 having a first end coupled to the inner edge 66 of the central opening 54 by a fold line 90. The legs 86 have a second end 92 coupled to the inner edge 76 of the support plate 72 by a fold line 94. In the embodiment shown, the legs 86 have a substantially triangular shape where the fold line 90 has a length less than the fold line 94.

A support member 100 is also integrally formed with the blank 60 and is coupled to the inner edge 66 of the central opening 54 by a frangible tab 102 at a first edge 104 to enable the support member 100 to be separated from the mounting plate 38 by the end user. In the embodiment shown, the support member 100 is cut and stamped from the sheet material and is formed within the area defined by the legs 86, the top rail 40 and the support plate 72. As shown in FIG. 3, the blank 60 for the mounting bracket is formed as a single, one-piece unitary unit including the mounting plate 38, the cable guide 70, the support member 100 and the extension members 106.

The extension member 106 is integrally formed with a second edge 108 of the support member 100 by a frangible tab 110. In the embodiment shown, two extension members are formed with the blank 60. Each extension member 106 is formed with a longitudinal dimension extending substantially parallel to the longitudinal dimension of the support member 100.

During use and installation of the bracket 12, the support member 100 is separated from the top rail 40 by bending the frangible tab 102. The extension members 106 are separated from the support member 100 by bending the extension members 106 about the frangible tab 110 with respect to the support member 100. The cable guide 70 is bent outwardly from the plane of the mounting plate 38 by bending the legs 86 about the fold line 90 in the direction of arrow 112 in FIG. 7 to form the central opening 54. The support plate 72 is then bent about the fold line 94 relative to the legs 86 to the position shown in FIG. 7. The support plate 72 can be bent to a position at an incline with respect to the plane of the mounting plate 38 or substantially perpendicular to the plane of the mounting plate 38. In embodiments where the cable guide 70 is not needed or desired, the legs 86 can be folded upwardly relative to the top rail 40 to a position substantially parallel to the plane of the mounting plate 38. The support plate 72 can also be bent in any desired position relative to the mounting plate 38.

The support member 100 forms a support for the top rail 40 and bottom rail 42. The support member 100 defines a far side support for contacting an opposing wall surface to support the electrical box and the mounting bracket 12 thereby inhibiting bending and flexing of the mounting plate 38, the top rail 40 and the bottom rail 42. As shown in FIG. 12, the support member 100 is separated from the blank 60 and bent to the shape shown in FIGS. 13, 14 and 15. The support member 100 has a main central body 114 with a longitudinal dimension corresponding substantially the dimension of the width of the mounting plate. The central body 114 also has a length to extend between the top rail 40 and the bottom rail 42. Coupling members in the form of coupling tabs 116 are punched from the central body 114 and extend outwardly away from each other toward the longitudinal ends of the central body. The coupling tabs 116 as shown in FIG. 13 include a leg 118 extending substantially parallel to the plane of the central body 114 and spaced apart a distance corresponding substantially to the thickness of the top rail 40 and bottom rail 42. An angled end portion 120 extends from the end of the legs to assist in positioning on the top rail 40 and bottom rail 42 by sliding the respective coupling tabs 116 over the rails. The coupling tabs 116 are spaced apart a distance corresponding substantially to the inner dimension of the central opening and the spacing between the inner edges of the top rail 40 and the bottom rail 42. During use, the support member 100 is coupled to the top rail 40 and bottom rail 42 by the coupling tabs 160 as shown in FIG. 1 and FIG. 2. The support member 100 can be positioned at different locations along the longitudinal length of the central opening 54 depending on the location of the electrical box and the spacing between the support. In the embodiment shown, the support member 100 is positioned on the inner face of the top rail 40 and the bottom rail 42 to support the mounting plate.

The support member 100 includes legs 122 extending from the opposite ends of the central body 114. The legs are bent to the position shown in FIG. 13 by folding about the inner fold lines 124 or to the position shown FIG. 16 by bending about the outer fold lines 126. The fold lines 124 and 126 are defined by a slot 128 and 130, respectively, to allow the legs 122 to be bent by the end-user to the desired position. As shown in FIGS. 13-15 and 16-18, the fold lines determine the length of the legs. The legs 122 include side edges with reinforcing flanges 132 to strengthen the legs. As shown, the flanges 132 are stamped and bent to form a substantially L shape flange extending parallel to the plane of the legs.

Figure 17:
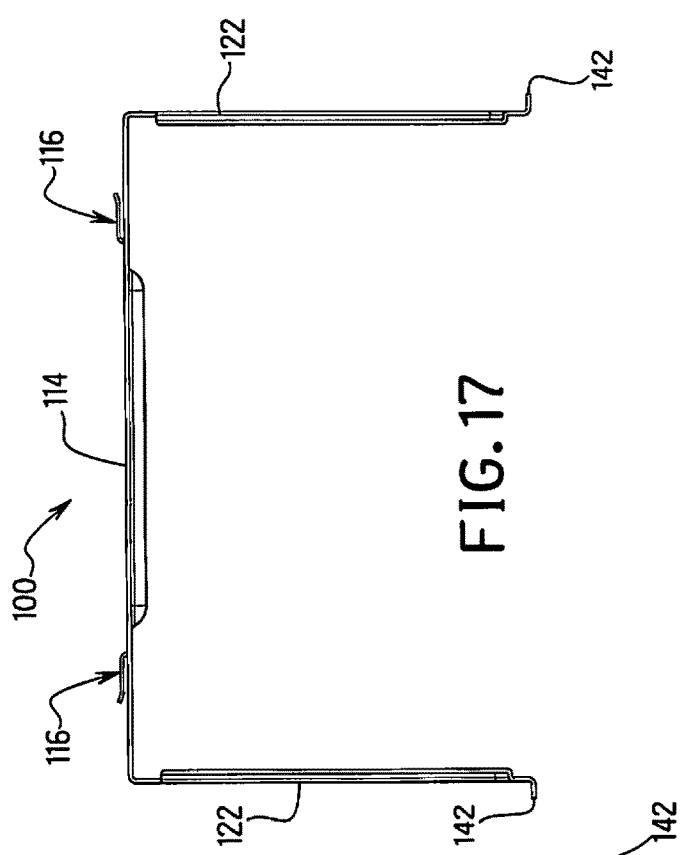
FIG. 17 is a side view of the support member in the embodiment of FIG. 16.
Figure 18:
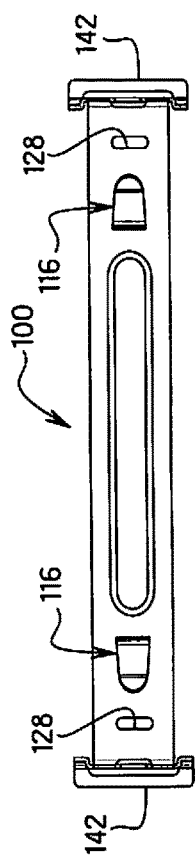
FIG. 18 is a top view of the support member of the embodiment of FIG. 16.
Figure 16:
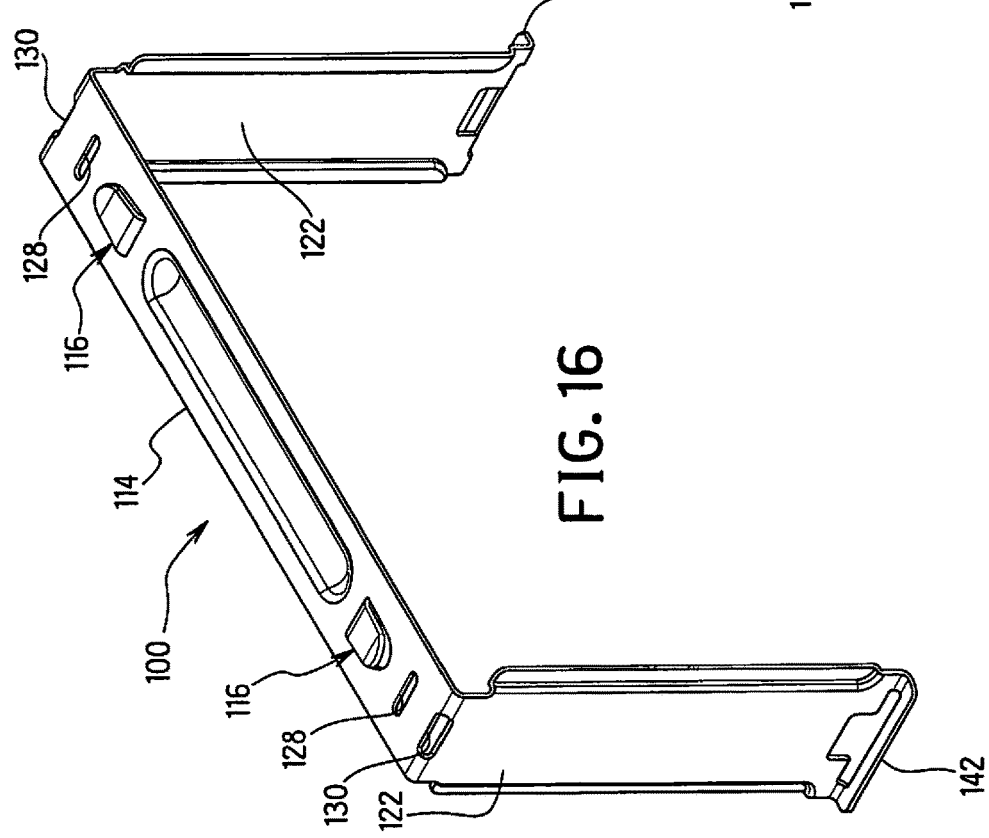
FIG. 16 is a perspective view of the support member showing the legs extending from the body of the support member and the ends of the legs bent outwardly.
Figure 20:
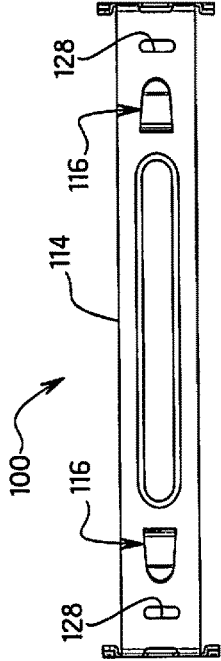
FIG. 20 is a top view of the support member in the embodiment of FIG. 19.
Figure 21:
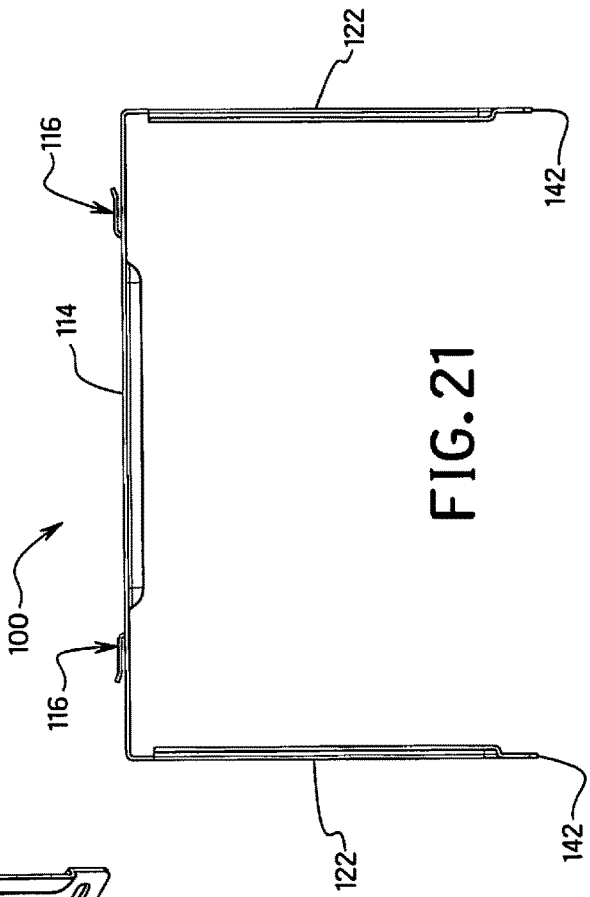
FIG. 21 is a side view of the support member in the embodiment of FIG. 19.
Figure 19:
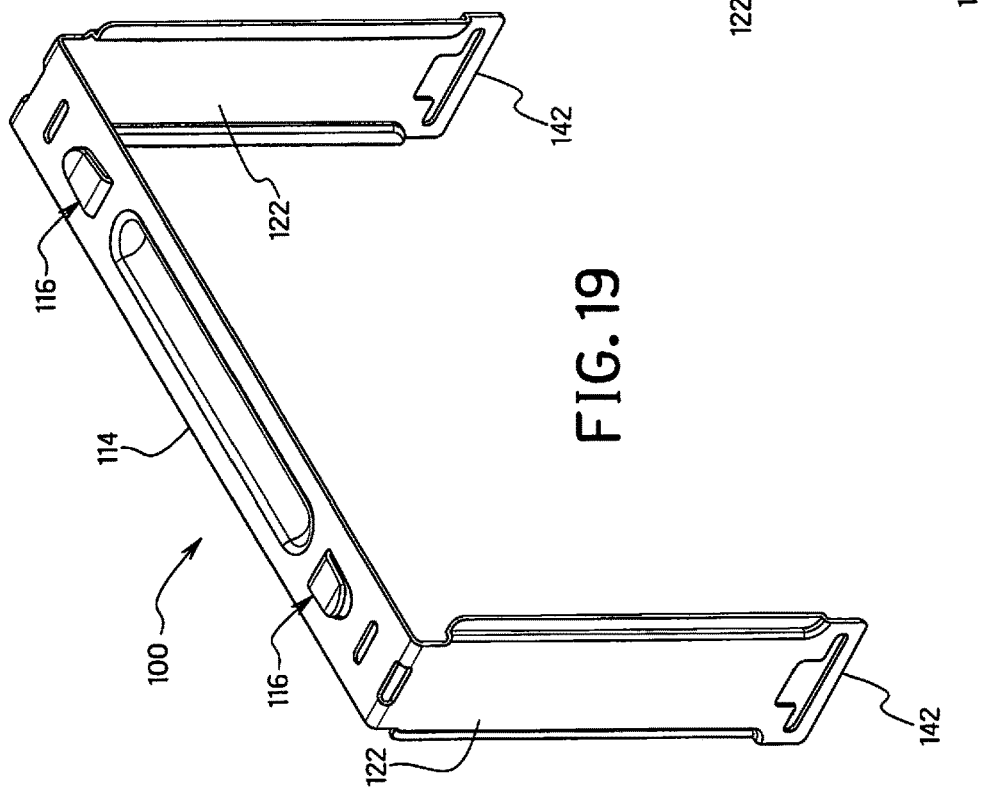
FIG. 19 is a perspective view of the support member bent to an extended position in another embodiment of the invention.

The legs 122 have a first end 134 coupled to the central body 114 and a second distal end 136. The second end 136 is provided with a slot 138 having an enlarged portion 142 to define the slot with a substantially T shape. As shown in FIGS. 12-15, the legs 122 can be bent about the first inner fold line 124 to a position substantially perpendicular to the plane of the central body 114. Alternatively, the legs 122 can be bent about the second outer fold lines 126 as shown in FIGS. 16-18 and FIGS. 19-21 depending on the depth of the wall cavity. As shown in FIGS. 16-18, the end portion 142 can be bent about the slot 138 to shorten the longitudinal length of the legs as needed and form a flat contact surface for the legs.

The extension members 106 are separated from the support member 100 during use. As shown in FIGS. 22 and 23, the extension members 106 have a substantially planar configuration formed by a body 146 having longitudinal side edges 148, a first longitudinal end 150 and a second longitudinal end 152. A first coupling tab 154 is formed at the first end 150 and a second coupling tab 156 is formed at the second longitudinal end 152. A longitudinal flange 158 extends along a side edge 148 to strengthen the extension member 106.

The first coupling tab 154 is cut and punched from the body 146 and has a leg 160 extending substantially parallel to the plane of the body 146 with a free end 162 extending toward the first longitudinal end 150. An outwardly extending flange 164 is bent outwardly from the plane of the leg 160. A tab 166 is cut and punched from the leg 160 and bent inwardly toward the body 146 about the fold line 168. In the embodiment shown, the tab 166 extends at an incline with respect to the plane of the leg 160 and away from the free end 162 and toward the longitudinal end 152.

The second coupling tab 156 is formed in a similar manner by cutting and punching from the body 146. The second coupling tab 156 includes a leg 170 extending substantially parallel to the plane of the body 146 with the free end 172. The free end 172 extends toward the second end 152 of the body 146. An outwardly extending flange 174 is bent outwardly from the plane of the leg 170. A tab 176 is cut and punched from the leg 70 and bent inwardly toward the body 146 about a fold line 178. The tab 176 extends away from the free end 172 and toward the first longitudinal end 150. The coupling tabs 154 and 156 are spaced apart from the plane of the body 146 a distance corresponding to the thickness of the legs 126 of the support member 100.

As shown in FIGS. 22 and 23, the first coupling tab 154 is spaced from the first end 150 a first distance less than the distance between the second coupling tab 156 and the second end 152. The coupling tabs 154 and 156 are spaced differently depending on the desired length of the support member and the dimensions of the cavity in the wall.

Referring to FIGS. 24-27, the extension members 106 can be coupled to the ends of the legs 122 of the support member 100 to extend the length of the legs as needed. As shown in FIG. 24, the extension members 106 are coupled to the ends of the legs 122 by the second coupling tab 156 by sliding the end of the legs 122 between the leg 170 of the coupling tab 156 and the body 146 of the extension member. The tab 176 is deflected and snaps into the slot 138 at the end of the leg 122 for coupling the extension member to the ends of the legs and resisting movement between the extension members 106 and the respective leg 126.

As shown in FIG. 25, the extension members 106 can be coupled to the ends of the legs 122 by the first coupling tabs 154 to increase the length of the legs. In a similar manner, the ends of the legs 122 slide between the leg 160 of the coupling tab 154 to engage the tab 166 with the slot 138. As shown in FIGS. 26 and 27, the coupling tab 166 slides over the end of the leg 122 and engages the inner edge of the slot 138 for coupling the extension members 106 to the ends of the leg.

During use, the end-user attaches the support member 100 to the top rail 40 and the bottom rail 42 as shown in FIG. 1 and FIG. 2. The legs 122 are bent along the appropriate fold line and the extension members 106 are attached to the ends of the legs as needed depending on the depth of the wall cavity. In the embodiment shown in FIGS. 1 and 2, the extension members are not used since the dimensions of the legs 122 are sufficient to contact the opposing wall defining the wall cavity to support the electrical box and the top rail 40 and the bottom rail 42 to stabilize the electrical box.

As shown in FIGS. 28 and 29, the cable guide 170 is bent by the end-user to a position to accommodate the electrical cables 180 extending from the electrical box 14. The tab 80 is initially bent away from the plane of the support plate 72 as shown FIG. 28 to provide the access opening 82 between the adjacent cable openings 78 sufficient to allow the cables 182 to be positioned within the respective cable opening 78. After the cables 180 are positioned in the respective cable openings 78, the tab 80 is bent to the original position shown in FIG. 29 to close the opening between the adjacent cable openings and retain and secure cables 180 within the cable openings.

While various embodiments have been illustrated and described, it will be understood that various changes and modifications can be made without departing from the spirit and scope of the invention as defined in the appended claims.

What is claimed is:

1. A mounting bracket for mounting an electrical box comprising:
   a mounting plate having central opening having an inner edge, said central opening configured for accommodating the electrical box; and
   a cable guide integrally formed with said mounting plate and coupled to said inner edge of said central opening, said cable guide oriented in a first position in a plane substantially parallel to plane of the mounting plate and being bendable about a first fold line from said first position to a second position extending out of the plane of said mounting plate and to a position spaced outward from said inner edge of said central opening, wherein said cable guide has a first edge coupled to said mounting plate, and a second edge spaced from said first edge, at least one cable opening configured for supporting a cable, and said second edge having an open portion to said at least one cable opening in said mounting plate.

2. The mounting bracket of claim 1, wherein said cable guide includes at least two adjacent cable openings proximate said open portion on said second edge.

3. The mounting bracket of claim 2, wherein said cable guide includes a leg having a first end coupled to said inner edge of said central opening by said first fold line, and said leg has a second end coupled to said first edge of said cable guide by a second fold line.

4. The mounting bracket of claim 2, wherein said at least two cable openings are spaced apart along said second edge, each of said cable openings having an open area facing an adjacent cable opening.

5. The mounting bracket of claim 4, wherein said cable guide has a bendable tab between said adjacent cable openings, said bendable tab being bendable between an open position to enable the cable to be received in said adjacent cable openings and a closed position in said open area to capture said cable in said respective cable opening.

6. The mounting bracket of claim 5, wherein said bendable tab in said closed position closes each said adjacent cable openings.

7. The mounting bracket of claim 1, wherein said cable guide includes a first leg and a second leg, said first leg and second leg having a first end coupled to said inner edge of said central opening of said mounting plate by said first fold line, and said first and second legs having a second end coupled to said first edge of said cable guide by a second fold line.

8. A mounting bracket for supporting an electrical box, said mounting bracket comprising:
   a mounting plate having a central opening with an inner edge;
   a cable guide coupled to said mounting plate and being oriented in a plane parallel to a plane of said mounting plate in a first position and being bendable about a first fold line to a second position out of the plane of said mounting plate to a second extended position for receiving a cable coupled to said electrical box, said cable guide having a support plate with at least two adjacent cable openings for receiving the cable, a bendable retaining tab between the adjacent cable openings, and being bendable between a first position to retain the cable in said respective cable opening and a second position to enable said cable openings to receive the cable.

9. The mounting bracket of claim 8, wherein said cable guide comprises a first leg and a second leg, each said legs having a first end coupled to said inner edge of said central opening of said mounting plate by said first fold line, and a second end coupled to said support plate of said cable guide by a second fold line.

10. The mounting bracket of claim 8, wherein said cable guide has a leg with a first end coupled to said inner edge of said central opening by said first fold line, and a second end coupled to said support plate by a second fold line.

11. The mounting bracket of claim 8, wherein support plate has a first edge and a second edge, said first edge coupled to said mounting plate by said first fold line, and said second edge of said support plate having an open area between said adjacent cable openings with a dimension for receiving the cable.

12. The mounting bracket of claim 11, wherein said bendable retaining tab is coupled to said support plate in said open area between said adjacent cable openings.

13. The mounting bracket of claim 12, wherein said support plate has an open area between said adjacent cable openings, said open area defining an open portion of said adjacent cable openings, and where said bendable retaining tab is oriented in said open area between said cable openings.

14. The mounting bracket of claim 13, wherein said bendable tab is bendable to said second position away from said open area of said support plate for receiving a respective cable in each said adjacent openings.

15. A mounting bracket for supporting an electrical box, said mounting bracket comprising:
   a mounting plate having a top rail, a bottom rail, a first end portion and a second end portion and having a central opening with a dimension for accessing the electrical box; and
   a cable guide having a support plate with a first edge and a second edge, a first leg having a first end coupled to an inner edge of said central opening by a first fold line and a second end coupled to said first edge of said support plate by a second fold line, and a second leg having a first end coupled to said inner edge of the central opening by a first fold line and a second end coupled to said first edge of said support plate by a second fold line, said cable guide being in a first position substantially parallel to a plane of said mounting plate and being bendable to a second position spaced outwardly from said mounting plate and being configured for receiving a plurality of cables from the electrical box, said support plate having a plurality of cable openings.

16. The mounting bracket of claim 15, wherein said second edge of said support plate of said cable guide has an open area for accessing at least one of said cable openings, said support plate has a bendable tab between two adjacent cable openings, said bendable tab being bendable from a first open position to retain the cable in a cable opening and a second position to allow said cable opening to receive the cable.

17. The mounting bracket of claim 16, wherein said open area in said second edge of said support plate is oriented between two adjacent cable openings with a dimension for receiving the cable, and where said two adjacent cable openings have an open side facing said open area between the two adjacent cable openings.

18. The mounting bracket of claim 17, wherein said bendable tab is oriented in said open area to retain a respective cable in each of said adjacent cable openings.

19. the mounting bracket of claim 15, wherein said second edge of said support plate has at least one open area for accessing two adjacent cable openings.

20. The mounting bracket of claim 19, wherein said at least one open area in said second edge has a dimension less than an inner dimension of each of said adjacent said cable openings.

\* \* \* \* \*